United States Patent
Doerr et al.

(10) Patent No.: US 6,754,410 B1
(45) Date of Patent: Jun. 22, 2004

(54) INTEGRATED WAVELENGTH-SELECTIVE CROSS CONNECT

(75) Inventors: Christopher Richard Doerr, Middletown Township, Monmouth County, NJ (US); Corrado P. Dragone, Little Silver Township, Monmouth County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/447,967

(22) Filed: May 29, 2003

(51) Int. Cl.[7] ............................. G02B 6/12; H04J 14/00
(52) U.S. Cl. .......................... 385/16; 385/15; 385/18; 385/24; 385/37; 385/129; 385/130; 385/14; 398/45; 398/50; 398/82; 398/84; 398/96
(58) Field of Search ............................. 385/15, 16, 17, 385/18, 24, 31, 14, 33, 37, 39, 129–130; 398/45, 50, 82, 84, 96

(56) References Cited

U.S. PATENT DOCUMENTS

| | | | |
|---|---|---|---|
| 5,136,671 A | * | 8/1992 | Dragone ...................... 385/46 |
| 5,953,143 A | * | 9/1999 | Sharony et al. ................ 398/46 |
| 6,208,442 B1 | * | 3/2001 | Liu et al. ......................... 398/9 |
| 6,259,833 B1 | * | 7/2001 | Doerr et al. ................... 385/17 |
| 6,327,398 B1 | * | 12/2001 | Solgaard et al. .............. 385/18 |
| 6,389,190 B2 | * | 5/2002 | Solgaard et al. .............. 385/18 |
| 6,493,117 B1 | * | 12/2002 | Milton et al. .................. 398/49 |
| 6,542,655 B1 | * | 4/2003 | Dragone ....................... 385/17 |
| 2002/0071627 A1 | * | 6/2002 | Smith et al. ................... 385/15 |
| 2003/0133641 A1 | * | 7/2003 | Yoo ............................... 385/14 |

* cited by examiner

Primary Examiner—Brian M. Healy

(57) ABSTRACT

An integrated 1×K wavelength-selective cross connect (WSC) comprises a demultiplexer arranged to couple each of the N individual wavelength in an input optical WDM signal to a different one of N demultiplexer outputs. Each of N planar beam steerers, arranged along the left edge of a free space region, receives and directs a different one of the N light beams from the demultiplexer to a location on the right edge of the free space region. Each of K gratings arranged along a different location on the right edge of the free space region multiplexes together any light beam received at that location. The 1×K WSC can be implemented with or without the use of crossovers.

10 Claims, 5 Drawing Sheets

INTEGRATED WAVELENGTH-SELECTIVE CROSS CONNECT

TECHNICAL FIELD OF THE INVENTION

This invention relates generally to optical communications, and more particularly, to a method of and apparatus for providing a 1×K integrated wavelength-selective cross connect for use in a wavelength division multiplex (WDM) network, where K is an integer representing the number of output paths.

BACKGROUND OF THE INVENTION

At nodes in a wavelength division multiplex (WDM) network, it is often necessary to route each wavelength channel from a single incoming fiber independently to one of a plurality (K) of output paths. Some of these paths may terminate (or be dropped) independently into a receiver, and some may continue through the node. Such a wavelength routing device can be called a 1×K wavelength-selective cross connect (WSC), where K is the number of output paths.

One illustrative 1×K WSC is described in the copending patent application entitled "INTEGRATED WAVELENGTH ROUTER," Ser. No. 10/035,628, filed on Nov. 1, 2001 pending, which is incorporated by reference herein. In that patent application, a WSC is comprised of a demultiplexer arranged to receive an input WDM signal containing N wavelengths, the WDM signal being demultiplexed into N separate wavelengths and applied to a binary tree containing $\log_2 K$ stages of interconnected 1×2 switches. The 1×2 switches can be integrated and have their outputs crossing each other at each stage. The outputs of the final stage are applied to, and combined in, K multiplexers, which provide the K outputs of the WSC.

While the above patent application provides an advancement over prior art arrangements, the crossovers utilized to enable interconnection between each switch stage add loss, crosstalk, and require extra real estate to the implementation of an integrated 1×K WSC device. Thus, what is desired is an integrated 1×K WSC device that can be implemented without the use of crossovers.

SUMMARY OF TILE INVENTION

In accordance with the present invention, an integrated 1×K WSC apparatus is described that can be implemented with or without the use of crossovers.

More particularly in one embodiment, our integrated 1×K WSC apparatus comprises a demultiplexer arranged to couple individual wavelengths in an input optical WDM signal to N respective demultiplexer outputs, where N is an integer greater than one, a free space region having a left edge and a right edge, N planar beam steerers arranged along the left edge of the free space region and each connected to a different one of the N demultiplexer outputs, K waveguide gratings arranged along the right edge of the free space region for multiplexing together multiple light beams received along the right edge of the free space region, where K is an integer greater than one, and wherein each beam steerer arranged along the left edge of the free space region can selectively direct a light beam from one of the N demultiplexer outputs to a waveguide grating arranged along the right edge of the free space region.

BRIEF DESCRIPTION OF THE DRAWINGS

The present invention will be more fully appreciated by consideration of the following Detailed Description, which should be read in light of the accompanying drawings in which.

In the following description, identical element designations in different figures represent identical elements. Additionally in the element designations, the first digit refers to the figure in which that element is first located (e.g., 101 is first located in FIG. 1).

DETAILED DESCRIPTION

Figure 1:
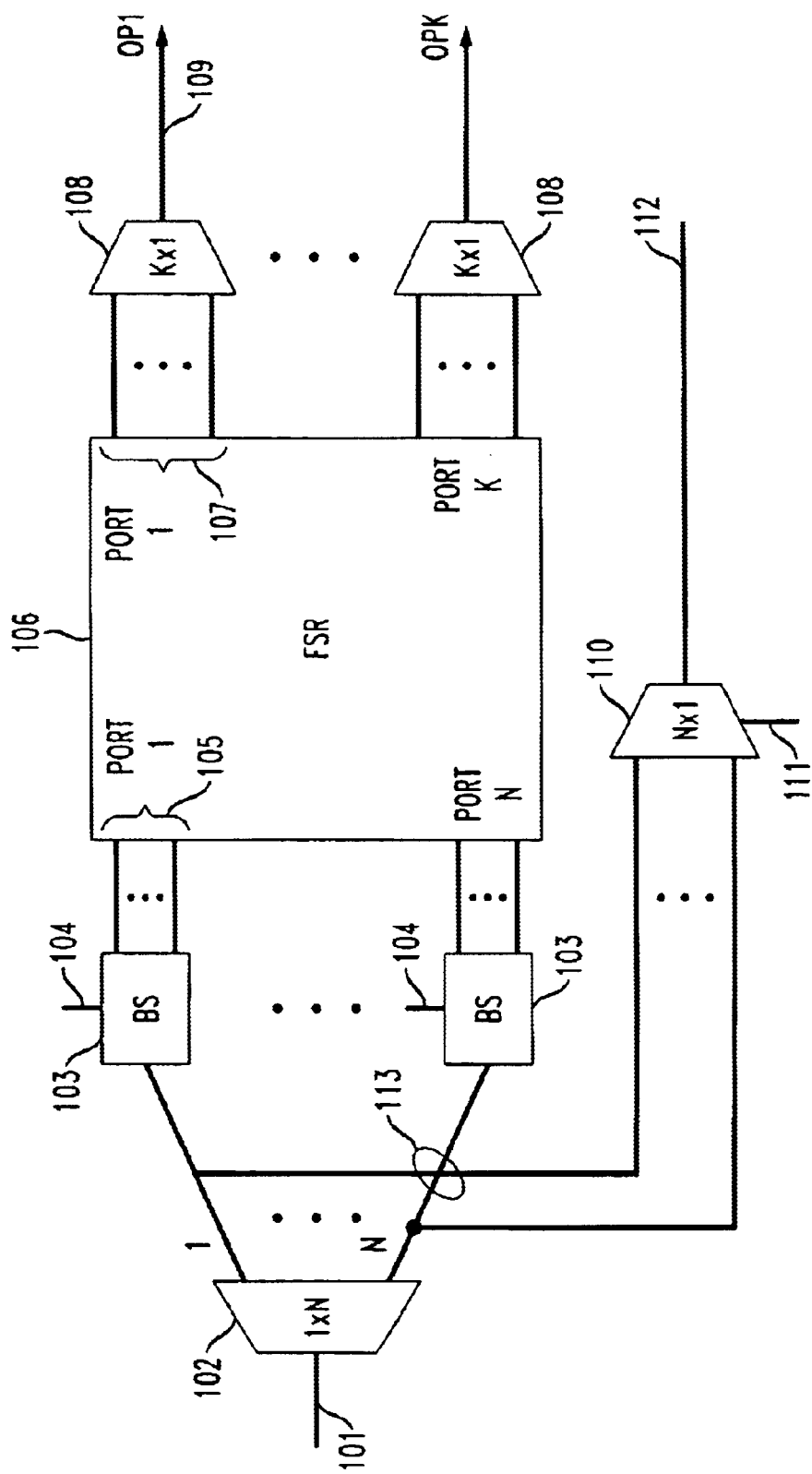
FIG. 1 illustrates a block diagram of an integrated 1×K WSC apparatus in accordance with the present invention.

With reference to FIG. 1 and in accordance with the present invention, there is shown a block diagram of our integrated 1×K optical wavelength selective cross connect (WSC) apparatus. An input port 101 receives a wavelength division multiplexed (WDM) signal, illustratively, including N wavelength channels $\lambda_1$–$\lambda_N$. A 1×N demultiplexer 102 couples N individual wavelength channels $\lambda_1$–$\lambda_N$ of the input optical WDM signal to N respective demultiplexer outputs, where N is an integer greater than one. Each of the N channels $\lambda_1$–$\lambda_N$, from each of the N demultiplexer outputs, are coupled by a different one of N controllable beam steerer 103 (each separately controlled via a control lead 104) to one of N input ports 105 on the left edge of free space area 106. Each beam steerer (BS) 103 functions to selectively direct a light beam, from one of the N demultiplexer 103 outputs, to one of K output ports 107 arranged along the right edge of the free space region (FSR) 106, where K is an integer greater than one. Each of the K output ports 107 can then receive, via an input port 105, one or more of the light beams of the N channels $\lambda_1$–$\lambda_N$, each light beam from a different one of the N demultiplexer 103 outputs. Thus for example, at the top output port 107 a light beam (representing a wavelength channel) can be received from only one input port 103 (e.g., from the top input port) under control of its associated beam steerer 103 or can receive multiple light beams each from a different one of the input ports 103 under control of their respective beam steerer unit 103. Similarly, other output ports 107 can receive light beams from one or more of the input ports 105 under control of their respective beam steerer unit(s) 103. At each output port 107, a separate waveguide grating or other wavelength multiplexer 108 multiplexes together the one or more light beams received at that output port. Thus, the K output ports 107 along the right edge of the free space region 106, collect the received light beams from one or more of the N channels $\lambda_1$–$\lambda_N$ to form a multiplexed signal which is outputted at their respective multiplexer output port 109. While our novel wavelength selective cross connect apparatus is shown as not utilizing crossovers, if the use of crossovers are found to be needed they can be utilized in the implementation.

In an additional enhancement, if a path from input 101 to output 112 with lower loss is required, a new path that bypasses the FSR 106 can be created by switches 110. Such a switch 110 arrangement may be used in a "drop" circuit to drop one or more wavelengths of the received WDM signal 101. Such an arrangement, however, would require crossovers 113 to enable the multiplexer 110 to gain access to each of the N outputs of the 1×N demultiplexer 102.

Figure 2:
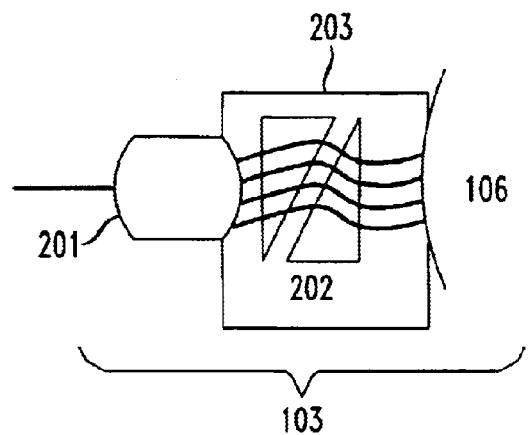
FIG. 2 shows a first embodiment of a beam steering unit, using a free space region and waveguide lens, which may be utilized in the 1×K WSC apparatus of FIG. 1.

FIG. 2 shows a first embodiment of a beam steering unit 103, including a free space region 201 and a waveguide lens 202, which may be utilized in the 1×K WSC apparatus of FIG. 1. The free space region 201 enables the light beam of a received wavelength channel to illuminate all of the waveguides of waveguide lens 203. The waveguide lens 203 is an array of waveguides of approximately equal length. The waveguide lens 203 includes a selectable linear phase shift element 202 (controlled via control lead 104) to enable beam steerer unit 103 to direct a light beam of a received wavelength channel to one of the output ports 107 of free space region 106 of FIG. 1. The linear phase shift element 202 provides a linear distribution of phase shift. The FIG. 2 embodiment of the beam steerer unit 104 may be implemented, illustratively, as shown and described (e.g., as planar beam steerer 10 in FIG. 1) in U.S. Pat. No. 6,259,833, entitled "OPTICAL CROSS CONNECT USING A PLANAR ARRANGEMENT OF BEAM STEERERS," issued on Jul. 10, 2001, and incorporated by reference herein. The free space region 106 may be a well known star coupler implemented as shown and described (e.g., as 10 of FIG. 1) in U.S. Pat. No. 5,136,671, entitled "OPTICAL SWITCH, MULTIPLEXER, AND DEMULTIPLEXER," issued on Aug. 4, 1992, and incorporated by reference herein.

Figure 3A:
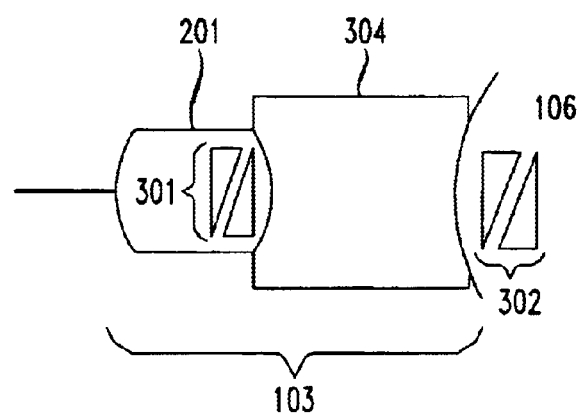
FIG. 3 shows two alternate embodiments of the beam steering unit of FIG. 2, where the beam steering is done either in the free-space regions or by optical switches.
Figure 4A:
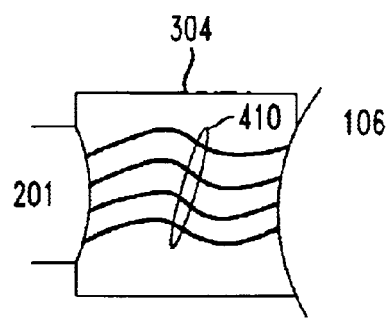
FIG. 4 shows three embodiments of lenses, used in the beam steerers of FIG. 3.
Figure 4B:
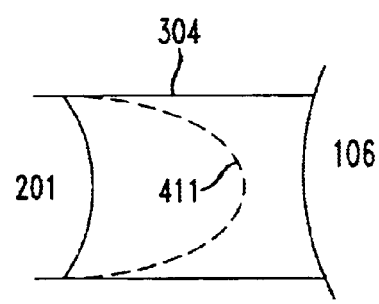
Figure 4C:
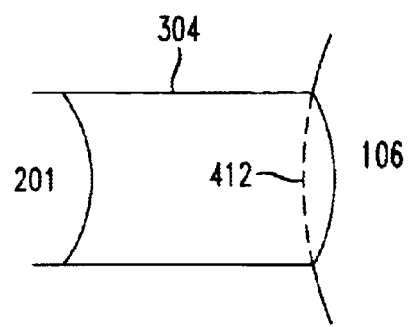

FIG. 3A shows a second embodiment of a beam steering unit 103 where the beam steering (the linear distribution of phase shift) is incorporated as part of either the free-space region 201 of the beam steering unit (as shown by 301) and/or as part of the free-space area 106 of the 1×K WSC apparatus of FIG. 1 (as shown by 302), rather than in the lens 304. In such a case, lens 304 is not necessarily a waveguide lens. It could be any of a number of integrated lenses, of which examples are shown in FIG. 4. Figure A shows a waveguide lens 410. FIG. 4B shows a lens 411 having a parabolic distribution of index, such as made by a thermooptic lens, created by heating the waveguide with a parabolic profile. FIG. 4C shows an etched lens, as described with reference to FIGS. 8, 9A and 9B of copending patent application entitled "N×N SWITCHING ARRANGEMENT OF TWO PLANAR ARRAYS WITHOUT WAVEGUIDE CROSSINGS," Ser. No. 10/115,828, filed on Apr. 3, 2002 pending, which is incorporated by reference herein.

Figure 3B:
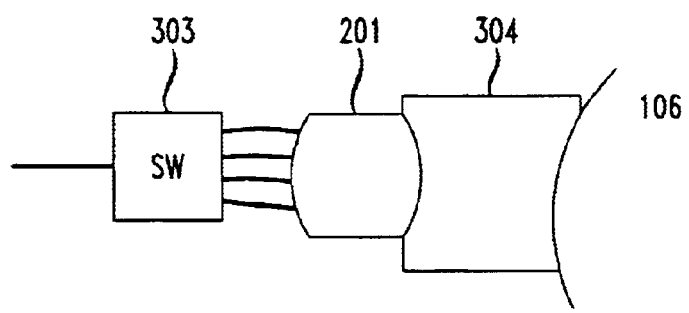

FIG. 3B shows a third embodiment of a beam steering unit 103 that includes a switch unit 303, (implemented, for example, using 1×2 switches) and a lens 304. Each of the 1×2 switches are externally controlled by a control signal (not shown) to direct a light beam to free-space region 201 to enable the light beam to be further directed to the desired output port 107 of free space region 106. The 1×2 switches may be implemented using any of the well-known techniques. The lens 304, as with the embodiment of FIG. 3A, can be any number of a different lens types, such as shown in FIG. 4.

Figure 7:
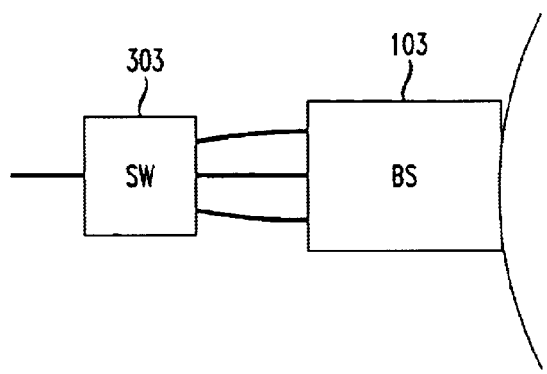
FIG. 7 shows an alternative embodiment of a beam steering unit, comprising a switching unit cascaded with a beam steering unit.

FIG. 7 shows a cascaded beam-steerer approach. The switch unit 303 in FIG. 7 sends the light to one of multiple waveguides, giving coarse steering. Then the beam steerer unit 103 performs fine steering about each position determined by which waveguide the switch unit 303 selected.

Figure 5:
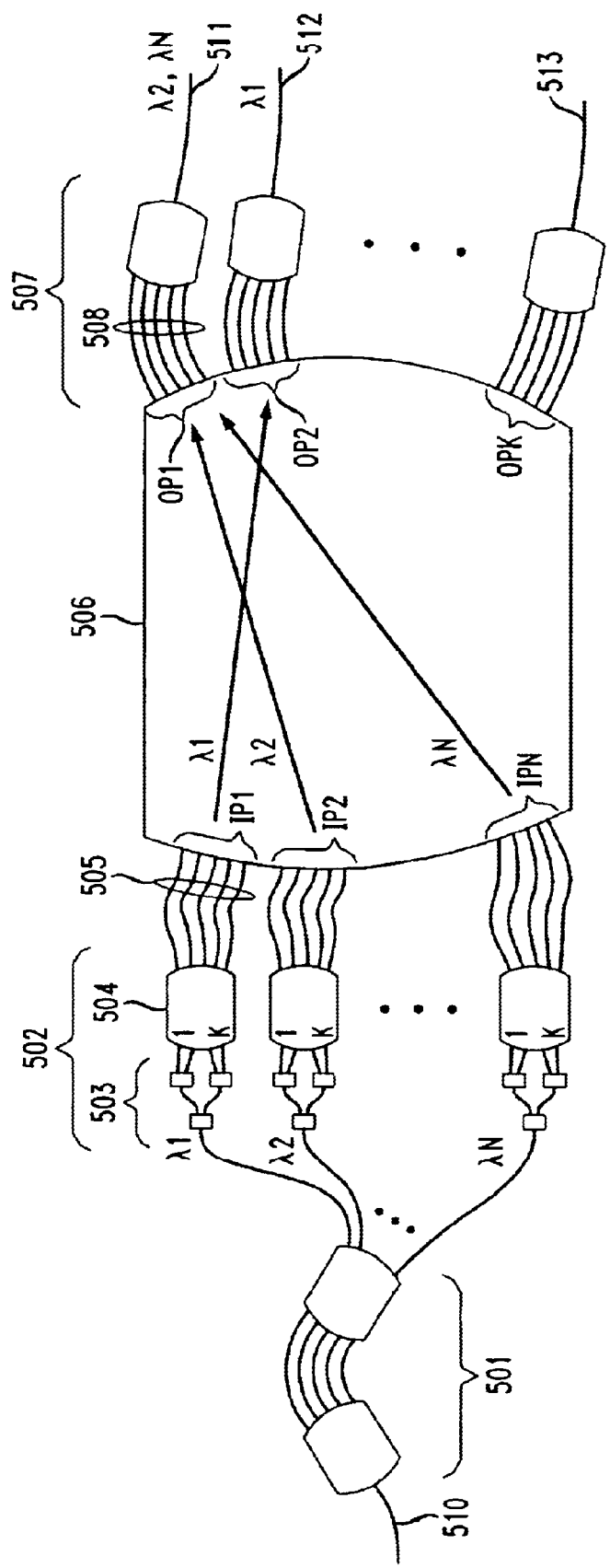
FIG. 5 shows a specific embodiment of an integrated 1×K WSC apparatus.

FIG. 5 shows a specific embodiment of an integrated 1×K WSC apparatus of FIG. 1. As shown, the demultiplexer function (102 of FIG. 1) is implemented using a well-known waveguide grating router 501. The demultiplexer could also be implemented as an echelle grating, or any of a number of different gratings. Each of the beam steerers (103 of FIG. 1) are implemented as shown by 502 which is the beam steerer embodiment illustrated by FIG. 3b combined with FIG. 4a, using an array of controllable 1×2 switches 503, a free space region 504, and waveguide lenses 505. Each of the K multiplexers (108 of FIG. 1) are implemented using waveguide grating routers 507. Note that waveguide grating router 507 utilizes the free space region 506 to illuminate its waveguides 508. The waveguide grating routers 501, 507 and free space region 506 may be implemented as described in the previously referenced U.S. Pat. No. 6,259,833. It should be noted that phase shifters could be placed in the waveguide lenses 505 instead of using an array of 1×2 switches 502. As previously described the beam steerers 502 could also be implemented as shown in FIGS. 2 and 3.

Illustratively, the operation of the optical wavelength selective cross connect apparatus of FIG. 5 is described. A WDM signal is received at input port 510 of the apparatus. Demultiplexer 501 demultiplexes the WDM signal and each of the wavelengths $\lambda_1$–$\lambda_N$ are coupled to a different one of the N controllable beam steerers 502. Each beam steerer 502, in response to a control signal, directs its wavelength from its input port on free space region 506 to an output port of free space region 506. As shown, illustratively, controllable beam steerer 502 directs wavelength $\lambda_1$ from input port 1(IP1) to output port 2 (OP2). Wavelength $\lambda_2$ is shown being directed from input port 2 (IP2) to output port 1 (OP1), while wavelength $\lambda_N$ is directed from input port N (IPN) to output port 1 (OP1). At output port OP1 the wavelengths $\lambda_1$ and $\lambda_N$ are multiplexed together by a multiplexer 507 to form the output signal on apparatus output port 511. At output port 2 (OP2) port, the wavelength $\lambda 2$ is multiplexed together with other received wavelengths (none shown) and outputted at apparatus output port 512. The other wavelengths of $\lambda_3$–$\lambda_{N-1}$ (while not shown) are similarly directed by their respective beam steerers to other output ports of free space region 506 where they are multiplexed together to form an output signal at the other apparatus output ports (e.g., 513).

Figure 6:
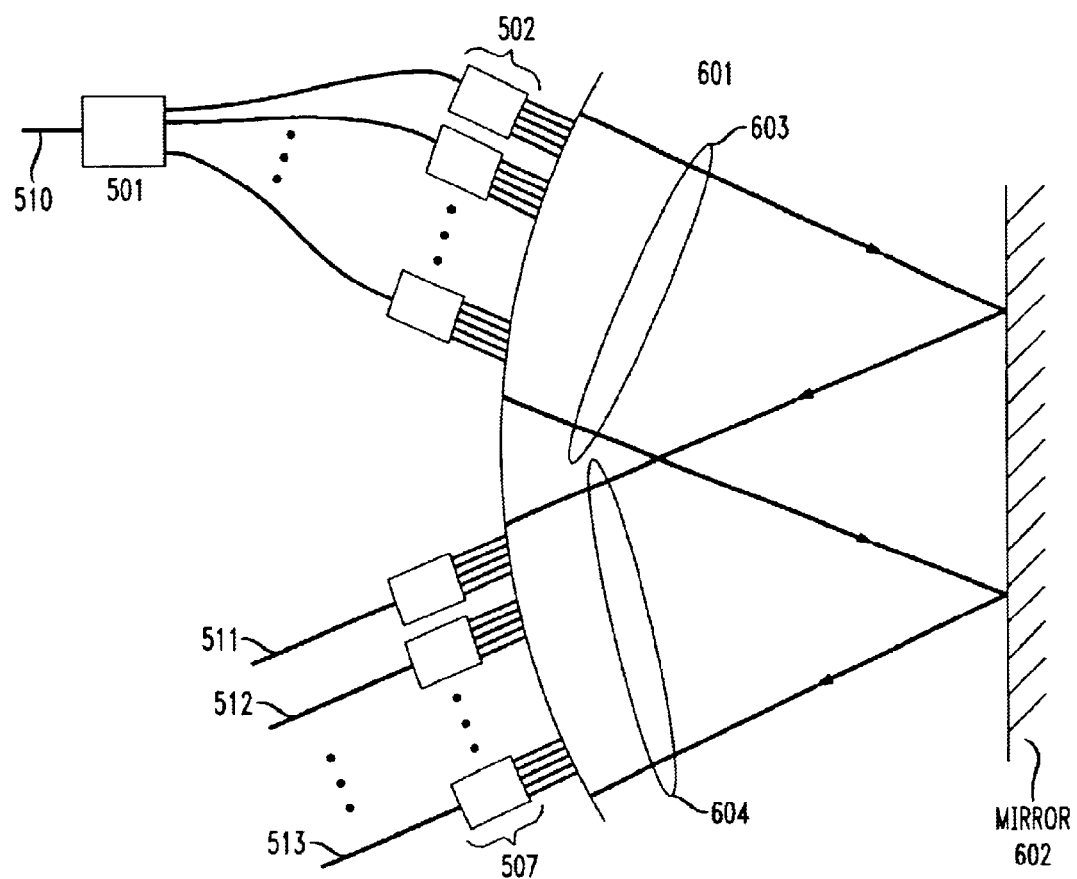
FIG. 6 shows an alternative embodiment of FIG. 5 which is formed as a reflective arrangement.

FIG. 6 shows the specific embodiment of the 1×K WSC apparatus of FIG. 5 formed as a reflective arrangement. The 1×K WSC reflective apparatus of FIG. 6 is formed using the same input arrangement 501, 502 as shown in FIG. 5 and operates in the same manner as previously described. Similarly, the output arrangement 507 of FIG. 6 is formed using the same output arrangement 507 as shown in FIG. 5 and operates in the same manner as previously described. In FIG. 6, however, the free space region 506 of FIG. 5 is split roughly in half forming a reflective free space region 601 that includes a reflector 602. Thus input optical signals 603 from demultiplexer 501 are directed by controllable beam steerers 502 to traverse the reflective free space region 601 where they are reflected by mirror 602 and the reflected output optical signals 604 are directed to the output arrangement 507. The free-space region 601 may be a slab waveguide. In such a case the reflector 602 can be a simple flat mirror either attached to the waveguide die or the waveguide die could be polished and a reflective coating deposited on the facet. Alternatively, the free-space region 601 may be true free space (i.e., unconfined in all dimension). In such a case, the reflective surface could be cylindrical-shaped mirror or it could be a flat surface, provided cylindrical lenses are placed appropriately near the free-space region 601 edges, as in "Optical Cross Connect Using a Planar Arrangement of Beam Steerers," U.S. Pat. No. 6,259,833, Jul. 10, 2001, by C. R. Doerr and C. Dragone.

We claim:

1. An optical wavelength selective cross connect apparatus comprising
    a demultiplexer arranged to couple individual wavelengths in an input optical WDM signal to N respective demultiplexer outputs, where N is an integer greater than one,
    a first free space region having a left edge and a right edge,
    N planar beam steerers arranged along the left edge of the first free space region and each connected to a different one of the N demultiplexer outputs,
    K gratings arranged along the right edge of the first free space region for multiplexing together multiple light beams received along the right edge of the first free space region, where K is an integer greater than one, and wherein
        each beam steerer arranged along the left edge of the first free space region can selectively direct a light beam, from one of the N demultiplexer outputs, to a grating arranged along the right edge of the first free space region.

2. The optical apparatus of claim 1 wherein at least one beam steerer includes
    an input waveguide having a first end connected to receive the light beam from one of the N demultiplexer outputs,
    a second free space region having a left edge connected to a second end of the input waveguide,
    a waveguide lens including an array of waveguides of equal length all terminated at one end on the right edge of the second free space region and having a second end terminated on an arc on the left edge of the first free space region,
    a planar phase shifter arrangement which provides a variable linear phase shift across the light beam.

3. The optical apparatus of claim 2 wherein the planar phase shifter arrangement is formed as part of the second free space region.

4. The optical apparatus of claim 2 wherein the planar phase shifter arrangement is formed as part of the first free space region.

5. The optical apparatus of claim 2 wherein the waveguide lens is an etched lens.

6. The optical apparatus of claim 1 wherein the first free space region is formed as a reflective free space region.

7. The optical apparatus of claim 1 further comprising a controllable wavelength selectable multiplexer, connected to the outputs of said demultiplexer, for selectively dropping one or more of the N demultiplexer outputs.

8. The optical apparatus of claim 1 being formed without the use of crossovers.

9. The optical apparatus of claim 1 wherein at least one beam steerer includes
    an input waveguide having a first end connected to receive the light beam from one of the N demultiplexer outputs,
    a 1×N switch array having an input connected to the second end of the input waveguide,
    a second free space region having a left edge connected to the N outputs of the 1×N switch array,
    a waveguide lens including an array of waveguides of equal length all terminated at one end on the right edge of the second free space region and having a second end terminated on an arc on the left edge of the first free space region.

10. The optical apparatus of claim 8 wherein the waveguide lens is an etched lens.

* * * * *